(12) United States Patent
Burns et al.

(10) Patent No.: US 7,539,640 B2
(45) Date of Patent: May 26, 2009

(54) AGGREGATED TRADING SYSTEM

(75) Inventors: Michael J. Burns, Chicago, IL (US); Fred Monroe, Silver Spring, MD (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

(21) Appl. No.: 10/702,288

(22) Filed: Nov. 6, 2003

(65) Prior Publication Data
US 2005/0102217 A1  May 12, 2005

(51) Int. Cl.
G06F 17/60  (2006.01)
(52) U.S. Cl. .................... 705/37; 705/35; 705/36; 705/64; 717/171; 717/176; 717/200
(58) Field of Classification Search ............... 705/1–45
See application file for complete search history.

(56) References Cited

U.S. PATENT DOCUMENTS

| | | | |
|---|---|---|---|
| 6,278,982 B1* | 8/2001 | Korhammer et al. ...... 705/36 R |
| 7,146,341 B1* | 12/2006 | Light et al. .................... 705/64 |
| 2002/0082852 A1* | 6/2002 | Greene et al. ................... 705/1 |
| 2002/0091617 A1* | 7/2002 | Keith .......................... 705/37 |
| 2002/0099562 A1* | 7/2002 | Bruce et al. .................... 705/1 |
| 2002/0128952 A1* | 9/2002 | Melkomian et al. ........... 705/37 |
| 2002/0188549 A1* | 12/2002 | Nordlicht ..................... 705/37 |

OTHER PUBLICATIONS

Casey D. Doyle, Computer Dictionary, 1994, Microsoft Press, edition 2, p. 201.*

Whatis.com, available at http://searchsoa.techtarget.com/sDefinition/0,,sid26_gci213581,00.html (last accessed Nov. 19, 2007) (defining "hosting").

Tech Encyclopedia at Techweb.com, available at http://www.techweb.com/encyclopedia/defineterm.jhtml?term=hosted+environment&x=35&y=9 (defining "hosting environment") (last accessed Nov. 19, 2007).

Tech Encyclopedia at Techweb.com, available at http://www.techweb.com/encyclopedia/defineterm.jhtml?term=hosting&x=36&y=11 (defining "hosting") (last accessed Nov. 19, 2007).

Google search results for "define: hosting" query, available at http://www.google.com/search?hl=en&q=define%3A+hosting (defining "hosting") (last accessed Nov. 19, 2007).

* cited by examiner

*Primary Examiner*—James P. Trammell
*Assistant Examiner*—Marissa Liu
(74) *Attorney, Agent, or Firm*—McDonnell Boehnen Hulbert & Berghoff LLP

(57) ABSTRACT

A trading system is described herein for hosting a collection of one or more electronic exchanges. The collection of electronic exchanges may be made up of separately designated exchanges under one or more authorizing and regulating bodies. The trading system receives from traders bids to purchase and offers to sell a tradeable object listed at one of the electronic exchanges. Then, the trading system directs the bids and offers to the appropriate exchange where the bids and offers may be automatically matched in the corresponding market. The trading system may also be used to take actions in one or more markets that are internal and external to the trading system on behalf of a trader using preprogrammed trading instructions.

12 Claims, 7 Drawing Sheets

AGGREGATED TRADING SYSTEM

FIELD OF INVENTION

The present invention is related to a computer-based system for facilitating the trading of tradeable objects, and more particular, relates to a computer-based system for hosting a collection of one or more electronic exchanges.

BACKGROUND

At one time, there were only open-outcry exchanges where traders, or more specifically buyers and sellers, would come together to trade in person. With the advent of electronic trading, traders may participate at their client devices from remote distances by communicating over physical networks with electronic exchanges that automatically match bids and offers.

In particular, subscribing traders are connected to an exchange's electronic trading platform by way of a communication link and through an application program interface to facilitate real-time electronic messaging between themselves and the exchange. The electronic trading platform includes at least one electronic market, which is at the heart of the trading system for a particular market and handles the matching of bids and offers placed by the subscribing traders for that market. The electronic messaging includes market information that is sent from the electronic market to the traders. Once the traders receive market information, it may be displayed to them on their trading screens. Upon viewing the information, traders can take certain actions including the actions of sending buy or sell orders to the electronic market, adjusting existing orders, deleting orders, or otherwise managing orders. Traders may also use software tools on their client devices to automate these and additional actions.

To set up an electronic exchange, one must generally get approval from a particular regulating commission. For example, in the field of futures, approval must come from the governmental authority known as the Commodity Futures Trading Commission (CFTC). An exchange may list one or more tradeable objects, but approval for each tradeable object must be given by the CFTC. Examples of registered exchanges with the CFTC in the Chicago, Ill. area includes the Chicago Board of Trade (CBOT) and Chicago Mercantile Exchange (CME), just to name a few.

In addition, the CFTC provides a list of the approved tradeable objects for the CBOT and CME. As used herein, the term "tradeable objects," refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradable objects.

Getting approval for an electronic exchange is one obstacle; however actually implementing a successful electronic exchange is another. For example, one must purchase or lease space to house the computer equipment. Then, computer equipment must be acquired such as servers, gateways, workstations, and so forth to run the exchange. Once traders are willing and interested in trading at the exchange, connections must be made from the traders to the exchange. This might entail setting up gateways to the traders so that they can receive market data feeds and so that the exchange can receive bids and offers. And when the exchange is up and running, it needs continuous support to maintain a robust trading environment. Even if an exchange already has such equipment to offer additional tradeable objects, the equipment may age or become obsolete, requiring expensive replacement by better and faster computers.

Also, the exchange's tradeable objects must be publicized to attract traders. Even with the best computer equipment and support, if traders are not there to trade then the exchange can die a premature death. Therefore, exchanges often strive to attract traders to increase volumes of their tradeable objects, keeping in mind most exchanges only make money when trading occurs. This is particularly difficult for upstart exchanges or newcomers looking to list their tradeable objects, for example.

Therefore, what is needed is an improved way of trading. In particular, a new way to list tradeable objects so that traders and exchanges may both benefit.

BRIEF DESCRIPTION OF THE DRAWINGS

Many aspects of the present embodiments may be better understood with reference to the following drawings. The components in the drawings are not necessarily to scale, emphasis instead being placed upon illustrating example embodiments.

DETAILED DESCRIPTION

I. Overview

Figure 1:
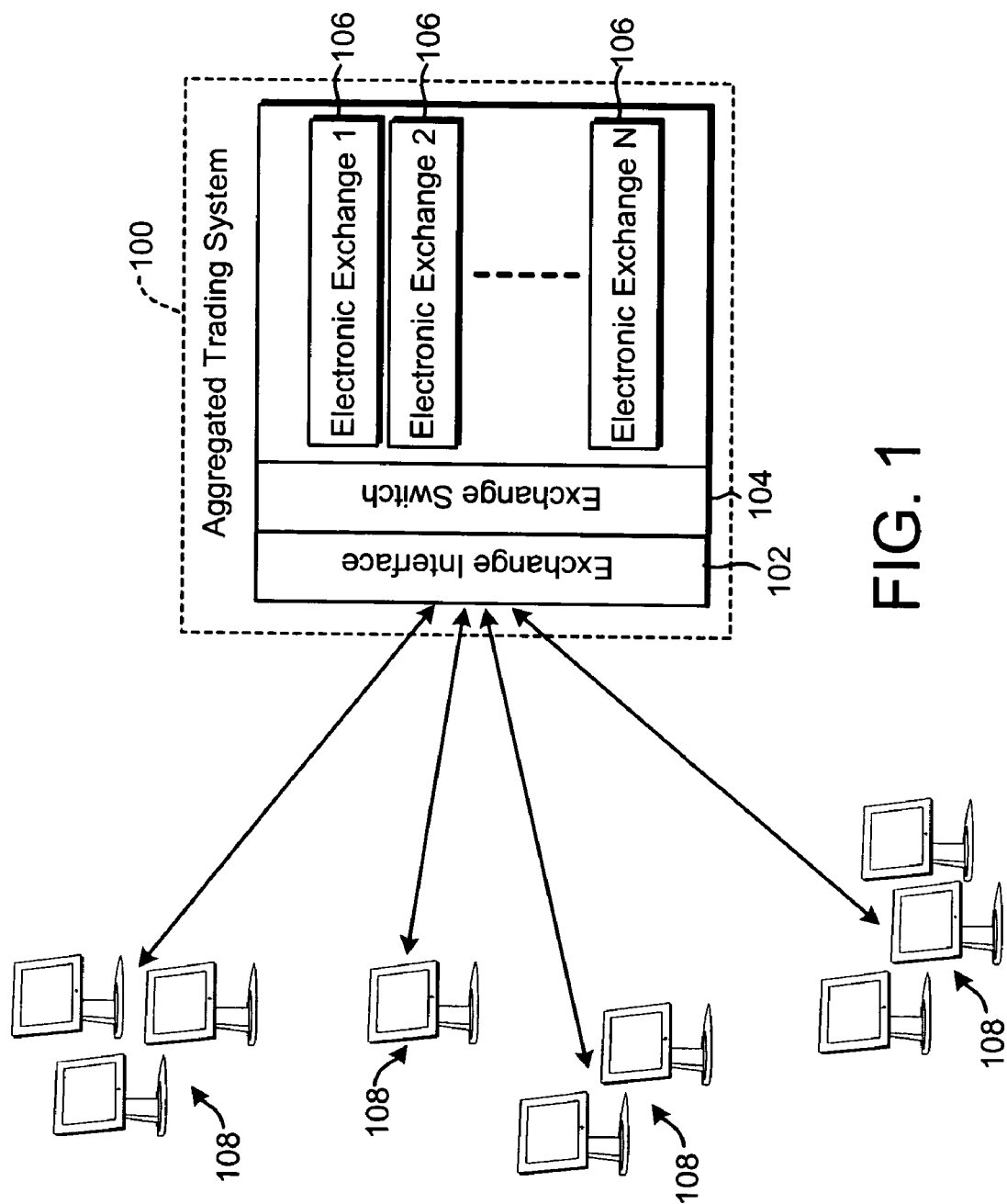
FIG. 1 is a block diagram that illustrates an example embodiment of the aggregated trading system in communication with one or more client devices.

According to the preferred embodiments, an aggregated trading system is described herein for hosting a collection of one or more independently registered electronic exchanges. In the preferred embodiment, the collection of electronic exchanges may be made up of separately designated exchanges under one or more authorizing and regulating bodies. Each electronic exchange preferably lists at least one tradeable object for trading amongst buyers and sellers, also referred to herein as traders. Preferably, the aggregated trading system receives from traders bids to purchase and offers to sell a tradeable object listed at one of the electronic exchanges. Then, the aggregated trading system automatically directs the bids and offers to the appropriate exchange where the bids and offers may be automatically matched in the corresponding market.

According to another aspect of the preferred embodiments, computer software that resides at the aggregated trading system may be used to take actions in one or more markets on behalf of a trader using preprogrammed trading instructions. In other words, now that more than one electronic exchange can be hosted by the aggregated trading system, it is also possible to efficiently integrate trading at markets listed at each of the various exchanges. For instance, a trader might want to trade tradeable objects listed at two different electronic exchanges, both of which are hosted by the aggregated trading system. Using this feature, the trader can provide trading instructions in advance to the aggregated trading system (or some component preferably residing within the trading system) that include actions to be taken when certain conditions occur in the markets. Then, when the stated condition occurs, the aggregated trading system will take action per the programmed trading instructions. For instance, when something happens in the first market based on the trading instructions, the aggregated trading system may take an action in the second market, and vice-versa. This intraexchange-trading feature opens up numerous possibilities in providing a trader-friendly environment while facilitating the trading of tradeable objects such that traders and electronic exchanges can both benefit.

According to yet another aspect of the preferred embodiments, the aggregated trading system may communicate with one or more external electronic exchanges, and more specifically, with matching engines that are external to the preferred system. This feature allows the aggregated trading system to act on behalf of a trader using preprogrammed trading instructions with other exchanges that are external to the system. Moreover, this feature allows the aggregated trading system to forward any actions taken from the trader to the external electronic exchange. For instance, a trader might wish to trade a tradeable object that is hosted at the aggregated trading system and a tradeable object that is hosted at an external electronic exchange. Using this interexchange-trading feature, the trader may simply connect to only the aggregated trading system, and still, the trader may trade at both electronic exchanges, if so desired.

A private corporation, public corporation, partnership, an individual, or some other body, collectively referred to herein as an entity, may have a tradeable object to trade. The present embodiments may be used by any entity to facilitate trading of a tradeable object. Examples of such entities are given below to illustrate the kinds of situations where the aggregated trading system may be of particular use. Of course, these examples are not meant to limit those who may use the present embodiments in any way.

According to one example, an individual (call him "John" for ease of illustration) might have come up with a new tradeable object and wishes to list the object for trade, but does not know how to do it. John could simply lease or rent space at the aggregated trading system to list his tradeable object. John could assist in the development of the matching engine used to match the incoming bids and offers for his tradeable object, or alternatively, someone associated with the aggregated trading system may develop the algorithms for him. Once John's matching system is up and running, he has the potential to reach a large amount of traders already connected to the aggregated trading system to trade his tradeable object.

According to another example, an exchange might have additional tradeable objects that it wishes to add to its offerings. However, the exchange does not want the extra expense in capital to support the new tradeable objects. As a result, the exchange could lease or rent space at the aggregated trading system to list the additional tradeable objects. If so desired, the trading of the tradeable object could even be set up to make the trader believe that he or she is trading at the actual exchange and not at the aggregated trading system. Then, with this sort of transparency to the trader, the trader could simply log onto the exchange and trade the tradeable object, even though the matching engine for the tradeable object is actually hosted at a location different than the exchange.

According to yet another example, an exchange might want to add redundancy to their exchange's computer system. For instance, the exchange could use the aggregated trading system as a backup to the exchange's own matching engines in case the exchange experiences downtime. An exchange could experience downtime during servicing to the matching engines, or if an outside computer virus hits the exchange's network, or a software bug is found in the exchange's computer system. Regardless of how the downtime occurs, once the exchange goes down (or parts of it), the traders may be immediately transported to trade the very same tradeable objects at the aggregated trading system.

According to another example, a newly registered exchange might want to start it's business as an electronic exchange. Without the expense associated with building an electronic exchange from scratch, the new exchange could simply obtain space at the aggregated trading system to offer it's new tradeable objects. Once the new exchange becomes a success, and if it is desired, it can eventually build up its resources to construct its own electronic exchange.

According to another example, a corporation may wish to acquire capital by issuing shares to investors. Transfer of ownership in the corporation may be accomplished by buying and selling shares of the stock, for example. The corporation may use a matching engine at the aggregated trading system to facilitate the trading of its stock. The corporation may also wish to hedge risk through the use of the aggregated trading system.

The above examples are provided to illustrate some situations where the aggregated trading system may be of particular use. One advantage, among many, of the aggregated trading system is that each of the entities illustrated above may list their tradeable objects at the same aggregated trading system which preferably has distribution to a large number of traders. Then, each entity has instant access to the large number of traders. Other systems, methods, features, and advantages of the preferred embodiments will be or become apparent to one with skill in the art upon examination of the following drawings and description. It is intended that all such additional systems, methods, features, and advantages included within the description be within the scope of the present invention, and be protected by the accompanying claims.

II. Aggregated Trading System

FIG. 1 shows a schematic of an example embodiment of the aggregated trading system of the preferred embodiments generally indicated as 100. Trading system 100 may be may be operated in software, hardware, or a combination thereof. In the preferred embodiments, trading system 100 is implemented in software that is stored in memory and is executed by a suitable instruction execution system. If implemented in hardware, as in an alternative embodiment, the trading system 100 may be implemented with any technology. For sake of illustration, the aggregated trading system 100 may operate on a server or a cluster of servers that work together to perform the functions described herein.

Trading system 100 may include an exchange interface 102, an exchange switch 104, and one or more electronic exchanges generally indicated as 106. Trading system 100 preferably communicates with client devices generally indicated as 108 via exchange interface 102. In particular, exchange interface 102 may receive bids to purchase and offers to sell a tradeable object listed at a particular electronic exchange. The exchange interface 102 is electronically coupled to the exchange switch 104 that in turn directs the bids or offers to the appropriate electronic exchange 106.

Client devices 108 preferably communicate with trading system 100 over one or more communication links generally indicated as 112. Communication links 112 may include direct communications lines, network connections, or a combination of the two. Examples of a direct communications line include digital communications lines provided by a common carrier such as a T-carrier (for example, T1, T2, T3, and so on), Digital Subscriber Line technology (DSL and its variations), cable modem technology, or direct satellite technology, to name a few. Direct communications lines may link the client devices 108 to trading system 100, or the communications lines may link the client devices 108 to points of access including gateways and routers (not shown for sake of clarity) that are then coupled to trading system 100. Network connections might include a local area network (LAN) and/or a wide area network (WAN). An example of a WAN is the Internet, which is a worldwide collection of networks and gateways that use the TCP/IP suite of protocols to communicate with one another. Regardless of the technology used in linking client devices 108 to trading system 100, it should be noted that client devices 108 may be local to trading system 100 such as physically located in the same room or building, or alternatively, client devices 108 may be remote to trading system 100 such that they are located in different buildings, different cities, or in different parts of the world.

Figure 5:
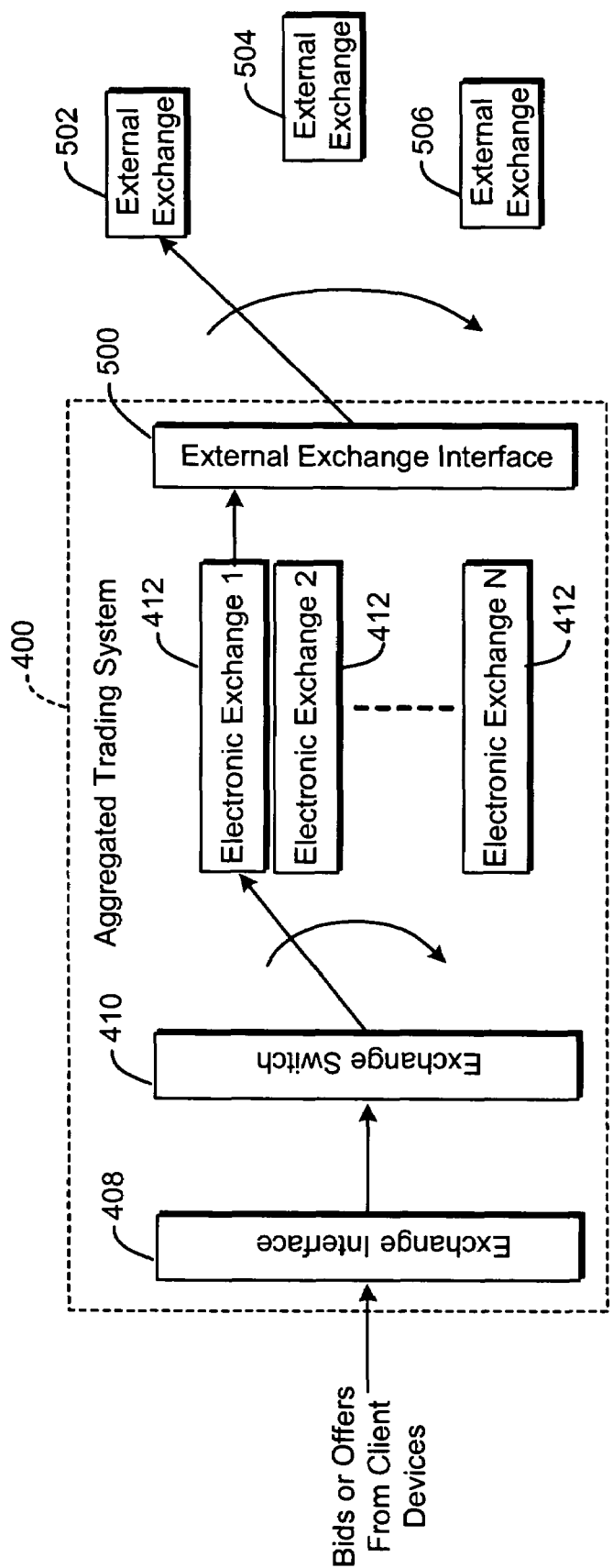
FIG. 5 is a schematic of a preferred embodiment of an aggregated trading system that includes an external exchange interface utilized to communicate with one or more external electronic exchanges, and more specifically, to communicate between matching engines that are external to the aggregated trading system.

Client devices 108 may be computing devices that provide an interface for traders to trade at one or more markets listed with one, some, or all of electronic exchanges 112 (and external electronic exchanges shown in FIG. 5). Some examples of client devices include a personal computer, laptop computer, hand-held computer, and so forth. Client devices 108, according to the preferred embodiments, include at least a processor and memory. The processor and memory, which are both well-known computer components, are not shown in the Figure for sake of clarity. Preferably, the processor has enough processing power to handle and process the various types of market information. For sake of illustration, client devices 108 may run any type of operating system, and examples of operating systems include Microsoft Windows and its variations (e.g., Windows 2000, Windows NT, Windows XP, and so forth), Linux, and Unix-type operating systems.

The trading system 100 may also communicate with other systems to facilitate the trading of tradeable objects. For example, according to some types of trading, a clearing organization is required to settle trades and regulate delivery. According to this example, each electronic exchange may be connected to external clearing organization using techniques known in the art. Alternatively, one or more separate clearing components may be added to the trading system 100 to perform the function of a clearing organization(s) or to communicate with an external clearing organization (not shown in the drawing). In another example, which is described later in this application, system 100 may communicate with other electronic exchanges, and more specifically, matching engines that are located external to trading system 100.

Figure 2:
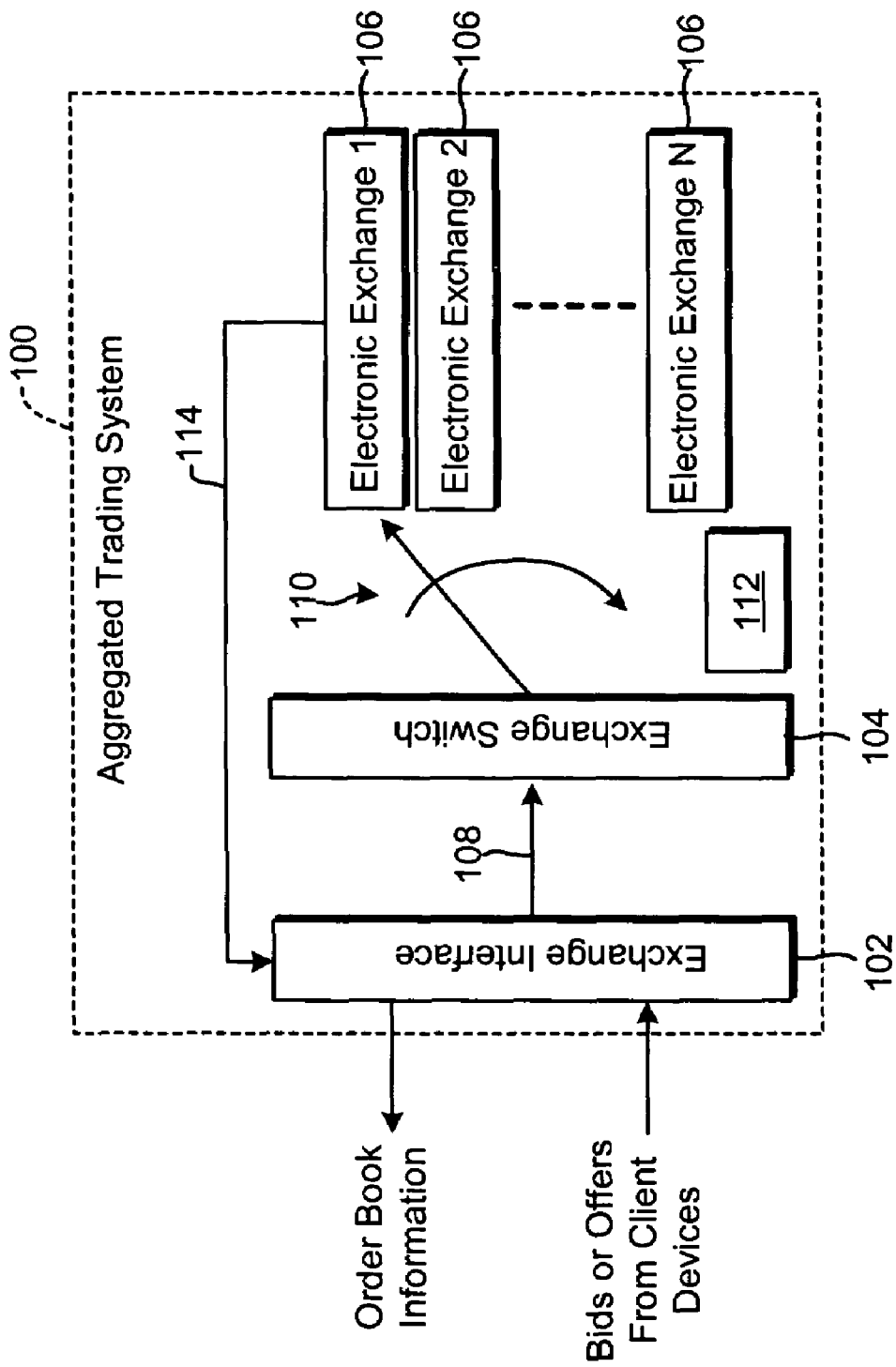
FIG. 2 is a schematic of a preferred embodiment of an aggregated trading system utilized to host a collection of electronic exchanges, and more specifically, to host a collection of matching engines used to match bids and offers.

FIG. 2 is a schematic representation of the hardware and/or software components that includes an embodiment of the aggregate trading system 100 shown in FIG. 1. In particular, bids and offers are received from client devices 108 at the exchange interface 102. Preferably, the exchange interface 102 is the point at which a connection is made between the client devices 108 and system 100 so that they can work with each other and exchange information. Preferably, the TCP/IP network communication protocol is used to exchange information between the client devices 108 and the exchange interface 102, although the preferred embodiment is not limited to the type of communication protocol used.

The aggregated trading system 100 further includes an exchange switch 104 that automatically directs the bids and offers to the appropriate electronic exchange 106. Exchange switch 104 may be electronically coupled to exchange interface 102 over data bus 108. Preferably, data bus 108 is an internal bus that is configured in parallel for speed, or alternatively, a data bus configured in series may be used. Preferably, bids and offers are contained in a message format which includes a destination address or an equivalent that may be used by the exchange switch 104 to determine its heading. Then, upon receiving a bid message or an offer message, for instance, the exchange switch 104 may parse the message to determine which exchange to route the bid or offer message.

Alternatively, exchange interface 102, exchange switch 104, and electronic exchanges 106 may be coupled by software means in addition to or in place of data bus 108 and/or data bus 110, which is described more below. According to this alternative embodiment, messages or parameters within the messages may be passed between the interface 102, switch 104, and exchanges 106 by other known mechanisms such as passed by reference, passed by address, or pass by value.

The aggregate trading system 100 further includes one or more electronic exchanges generally designated as 106 in FIG. 2. In the preferred embodiments, each electronic exchange is an independently operated exchange. For instance, each exchange would be registered as an exchange (or, at least in the preferred embodiments, each non-registered exchange would have a registered tradeable object to trade) by an authorizing body. To illustrate, in the field of commodities, the Chicago Board of Trade (CBOT) has been designated by the CFTC as a contract market under the Commodity Exchange Act. Other entities, for that matter, may be designated contract markets upon approval by the CFTC. The same might be true for other types of tradeable objects, except an entity might get approval under a different authorizing body or no authorizing body at all, if authorization is not necessary. For example, an electronic exchange might also include a marketplace that does not require approval from a governing body. For instance, trading airline tickets, hotels, car rentals, sports, and so forth, may not require a governing body.

It should be noted that additional electronic exchanges (matching engines) may be added to the trading system 100 as desired. Adding additional electronic exchanges may be accomplished by installing the appropriate software applications into memory or hard storage for execution. Such application programs may include a disk-based installation, or setup, program that does most of the work of preparing the program to work with the aggregated trading system, for example. The software program can check for devices attached to the system 100, request the user to choose from sets of options, create a place for the program on the hard disk, and/or modify system startup files as necessary. To remove electronic exchanges, each software application may be uninstalled. Applications may have built-in uninstall utilities, and in other cases a separate uninstall program can be used.

As shown in FIG. 2, an "N" number of electronic exchanges are coupled to exchange switch 104 to receive bids and offers. Exchange switch 104 may be electronically coupled to electronic exchanges 106 by a second data bus 110. Included with second data bus 110 may be a bus enumerator 112 that operates as a device driver to locate electronic exchanges 106 on the 110 and assign a unique identification code to each electronic exchange 106. Other ways of communicating between the exchange switch 104 and electronic exchanges 106 may be used such as implementing various software call routines like those mentioned above, for example.

Referring to FIG. 2, here is an example process of receiving bids and offers and directing them to an electronic exchange. Assume, for this example, that an offer message to sell "25" at "100" for "tradeable object M" at "electronic exchange 1" is received at exchange interface 102. Then, exchange interface 102 would preferably forward the offer message to exchange switch 104 where it parses the offer message and directs the offer message to "electronic exchange 1." Assume also that trading system 100 receives a second offer message to sell "30" at "50" for "tradeable object Y" at "electronic exchange 2." Now, exchange interface 102 would forward the second offer message to exchange switch 104 where it parses the message and directs the offer message to "electronic exchange 2." Trading system 100 may continually receive various bids and offers and direct them to the appropriate electronic exchange as they are received.

Preferably, trading system 100 further includes data line 114 that is used to carry order book information from the electronic exchanges 106 to exchange interface 102. In particular, data line 114 preferably couples each of electronic exchanges 106 with exchange interface 102 to carry order book information from the electronic exchanges 106 to exchange interface 102. Additionally, data line 114 may carry other useful information such as the last traded price, the last traded quantity, the settlement price, open prices, close prices, and so forth. Data line 114 may represent one or more internal busses to accommodate a desirable output bandwidth from the electronic exchanges 106 to exchange interface 102. Furthermore, traders may access order book information for each electronic exchange 106 at exchange interface 102 through the same communication link that they use to send bids and offers. It should be noted that the present embodiments are not limited to sending order book information through exchange interface 102, but rather a separate software component may be used to output such information to client devices 108.

According to the preferred embodiments, order book information may include the inside market, which is generally the current lowest sell price (sometimes referred to as the best ask) and the current highest buy price (sometimes referred to as the best bid). Order book information may also include market depth, which generally refers to quantities available in the market at the certain buy price levels and sell price levels. Of course, the number of price levels or market depth provided to a trader may depend on the electronic exchange. In addition, order book information might also include the open price, settlement price, net change, volume, last traded price, the last traded quantity, and order fill information. The present embodiments are not limited to the type of order book information provided.

III. Electronic Exchange Hosted by an Aggregated Trading System

Figure 3:
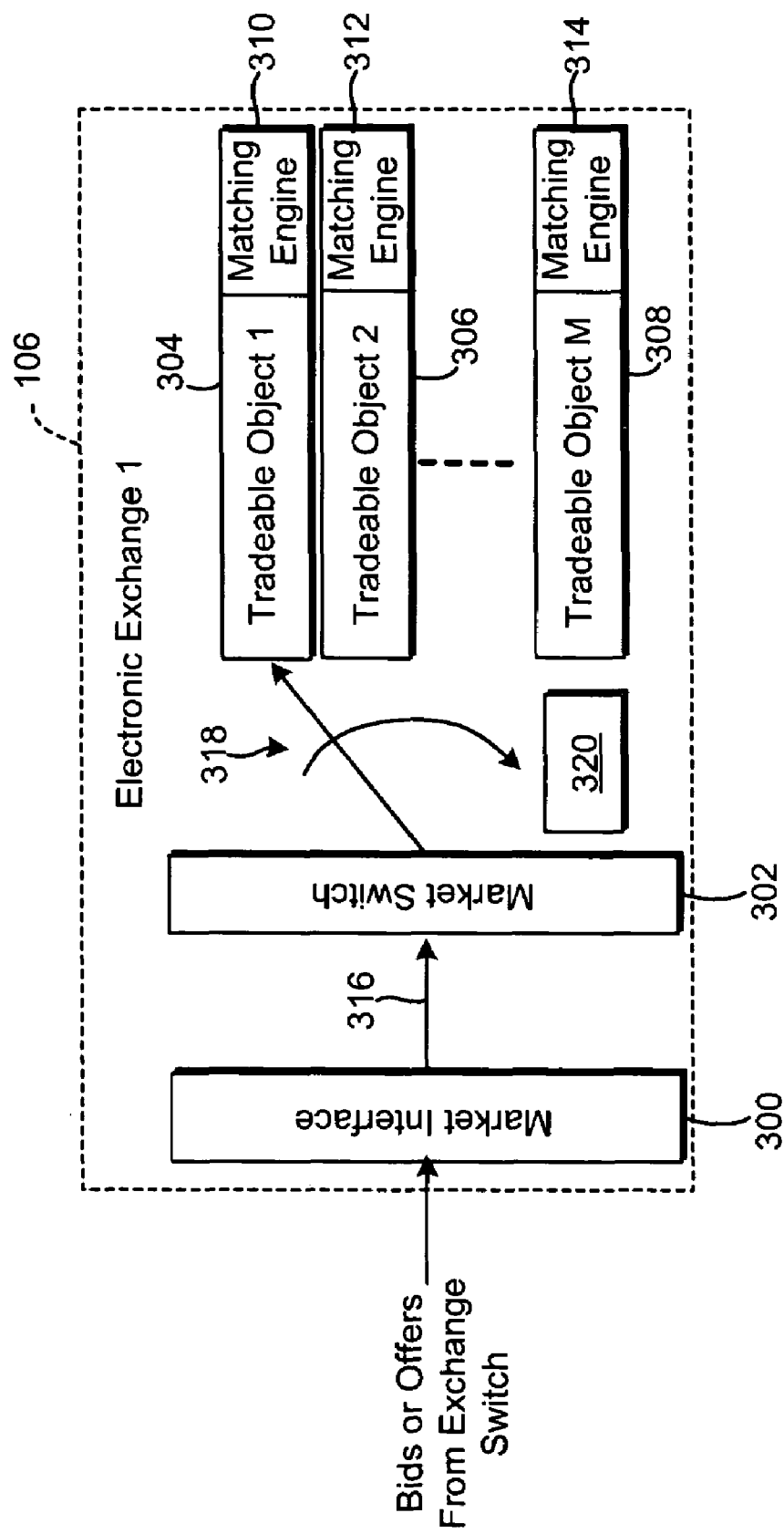
FIG. 3 is a schematic of a preferred embodiment of an electronic exchange that is hosted by an aggregated trading system and further shows a collection of matching engines.

FIG. 3 is a schematic representation of the hardware and/or software components which includes an embodiment of the "electronic exchange 1" shown in FIGS. 1 and 2. In particular, bids and offers are received from the exchange switch 104 (shown in FIG. 2) at the market interface 300. Preferably, the market interface 300 is the point at which a connection is made between the exchange switch 104 (shown in FIG. 2) and an electronic exchange.

The electronic exchange 106 further includes a market switch 302 that automatically directs the bids and offers to the appropriate market for a tradeable object 304, 306, 308 having matching engines 310, 312, 314, respectively. Market switch 302 may be electronically coupled to market interface 300 over data bus 316. Preferably, data bus 316 is an internal bus that is configured in parallel for speed, or alternatively, a data bus configured in series may be used. Preferably, bids and offers are contained in a message format which includes a destination address or an equivalent that may be used by the market switch 302 to determine its heading. Then, upon receiving a bid message or an offer message, for instance, the market switch 302 may parse the message to determine which tradeable object to route the bid or offer message.

Alternatively, market interface 300, market switch 302, and tradeable objects 304, 306, and 308 may be coupled by software means in addition to or in place of data bus 316 and/or 318. According to this alternative embodiment, messages or parameters within the messages may be passed between the interface 300, switch 302, and tradeable objects 304, 306, and 308 by other mechanisms such as passed by reference, passed by address, or pass by value.

According to the preferred embodiments, the "electronic exchange 1" may include one or more tradeable objects that may be installed or uninstalled. Market switch 302 may be electronically coupled to tradeable objects 304, 306, and 308 by a second data bus 318. Included with second data bus 318 may be a bus enumerator 320 which operates as a device driver to locate tradeable objects 304, 306, and 308 and assigns a unique identification code to each tradeable object. Other ways of communicating between the market switch 302 and tradeable objects 304, 306, and 308 may be used.

In the preferred embodiments, each tradable object is an authorized object for trading. For instance, each tradeable object may be registered by an authorizing body (e.g., the same authorizing body that exchanges are registered under). As shown in FIG. 3, there are an "M" number of tradeable objects to trade, namely, "tradeable object 1," "tradeable object 2," through "tradeable object M." Preferably, bids and offers are contained in a message format which include a destination address or an equivalent that may be used by the market switch 302. Then, upon receiving a bid message or an offer message, for instance, the market switch 302 may determine which matching engine 310, 312, 314 to route the bid or offer message.

Each tradeable objects 304, 306, and 308 may have a unique matching engine 310, 312, 314 associated with it. The matching engine preferably performs the function of automatically matching the incoming bids and offers to resting orders in the order book. Each matching engine may be uniquely designed for the particular tradeable object. In addition, each matching engine may run independently from the other matching engines. In other words, matching engine 310 may run independently of matching engine 312 and not be aware of the matches made by matching engine 312. Alternatively, the matching engines may be integrated with one another to allow for integrated matching algorithms (e.g., spread trading multiple tradeable objects). For example, matching engine 310 may be made aware of the orders processed by matching engine 312. Then, the two matching engines 310, 312 may perform functions that are interrelated with each other.

As shown in FIG. 3 and using the example set forth with respect to FIG. 2, the offer to sell "25" at "100" for "tradeable object M" at "electronic exchange 1" might be received at the market interface 300. Then, the market interface 300 would forward the offer to the market switch 302 where it automatically directs the offer to matching engine 314 for "tradeable object M."

IV. Trading with Internal Markets

Figure 4:
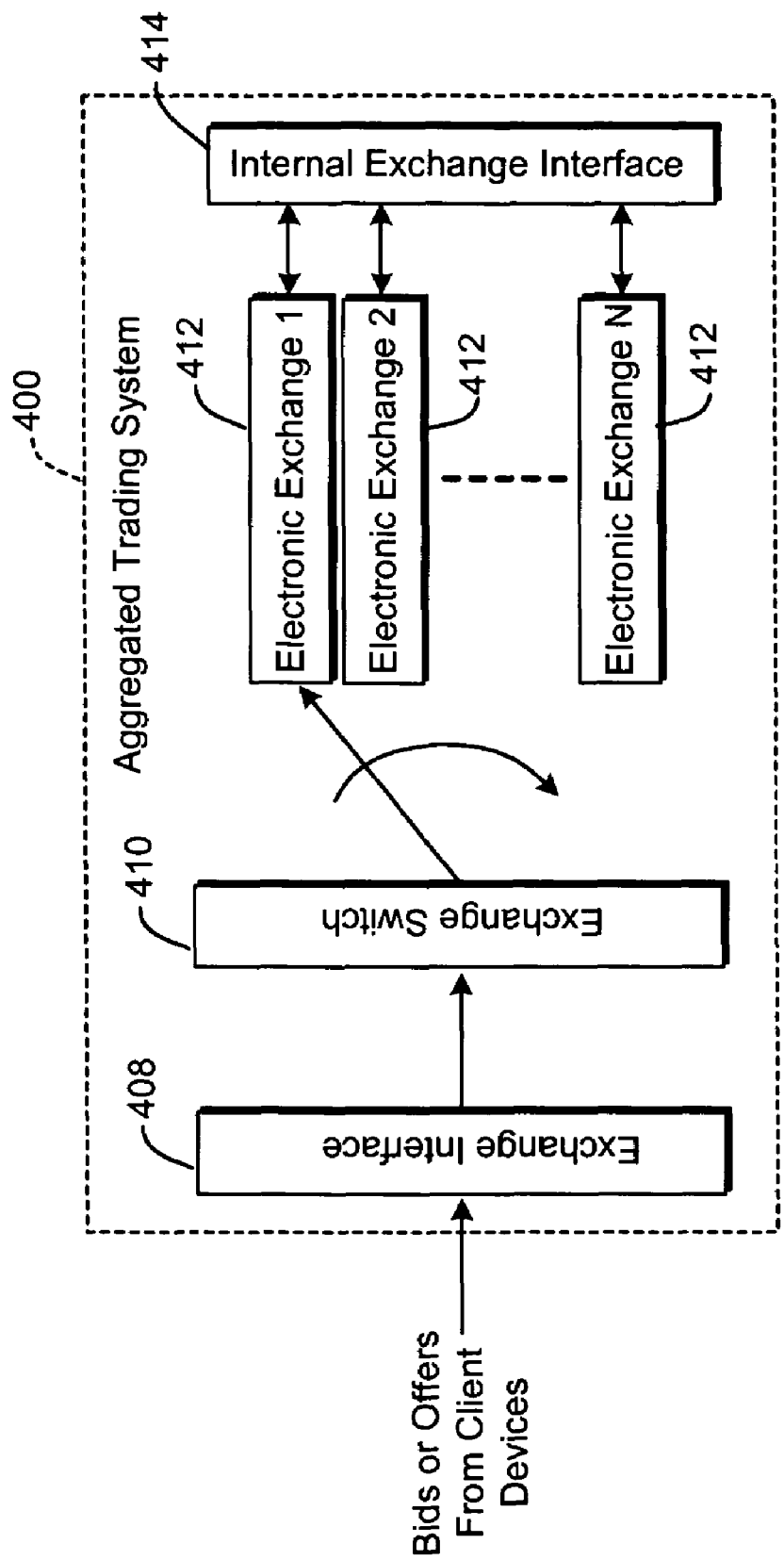
FIG. 4 is a schematic of a preferred embodiment of an aggregated trading system that includes an internal exchange interface utilized to communicate between internal electronic exchanges, and more specifically, to communicate between matching engines that are internal to the aggregated trading system.

FIG. 4 shows a schematic of an embodiment of the aggregated trading system of the preferred embodiments generally indicated as 400 with the addition of an internal exchange interface 414 for interconnecting electronic exchanges 412. This embodiment supports intraexchange trading by opening up communication between electronic exchanges 412 that are internal to the aggregated trading system 400.

In particular, the internal exchange interface 414 may be used to interface with one or more internal electronic exchanges indicated as 412. This feature is useful to perform actions at other markets with the electronic exchanges on behalf of the traders, and may be used for placing an order in a market, changing an existing order, or deleting an existing order by a electronic market at an exchange on behalf of a trader.

For example, programmed instructions may be stored at the internal exchange interface 414 and can be executed to take actions in one of the various exchanges 412. That way, various trading strategies may be implemented such as cross-exchange or cross-market spreads. Instructions may be received from traders, or alternatively, they may be downloaded from a user administrator of the preferred system, for example. U.S. patent application Ser. No. 10/628,631, entitled "System and Method for Improved Electronic Trading," filed on Jul. 28, 2002, the contents of which are herein incorporated by reference, describes a system and method for an exchange to act based on a market event on behalf of a trader. The system and method in the incorporated application may be used by the trading system 400 to facilitate intraexchange trading.

V. Trading with External Electronic Exchanges

FIG. 5 shows a schematic of an embodiment of the aggregated trading system of the preferred embodiments generally indicated as 400 in communication with one or more external electronic exchanges 502, 504, 506. System 400 preferably includes an exchange interface 408, exchange switch 410, one or more electronic exchanges indicated as 412, and external exchange interface 500. The exchange interface 408, exchange switch 410, and the one or more electronic exchanges 412 are described above.

According to the preferred embodiments, the external exchange interface 500 may be used to interface with one or more external electronic exchanges 502, 504, 506. An external electronic exchange is an exchange that operates outside of the trading system 400. This feature is useful to perform actions at outside exchanges on behalf of the traders, and may be used for placing an order in a market, changing an existing order, or deleting an existing order by an electronic market at an exchange on behalf of a trader. As mentioned above, U.S. patent application Ser. No. 10/628,631, entitled "System and Method for Improved Electronic Trading," describes a system and method for an exchange to act based on a market event on behalf of a trader. The system and method in the incorporated application may be used by the trading system 400 to facilitate interexchange trading.

It should be noted that the internal exchange interface 414 in FIG. 4 and the external exchange interface 500 may be used in the same aggregated trading system to provide both functions to the traders. Note again that each matching engine may use either interface 414 or 500, or both interfaces 414 and 500, or neither interface 414 or 500, depending on the desired matching functionality.

VI. Alternative Implementations of the Aggregated Trading System

Figure 6:
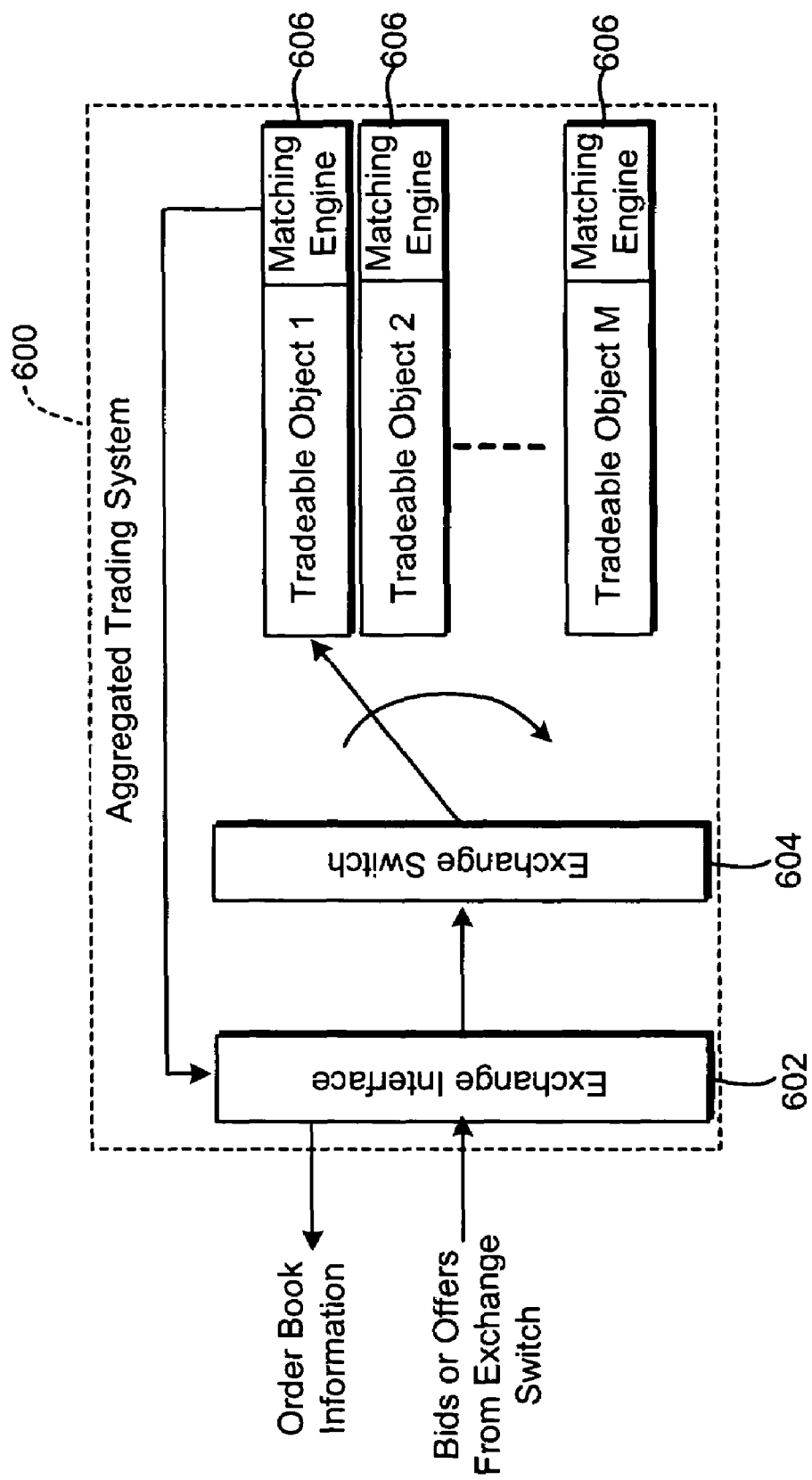
FIG. 6 is a schematic of an alternative embodiment of an aggregated trading system that includes interfacing client devices through a switch directly to matching engines and their tradeable objects.

FIG. 6 shows a schematic of an alternative embodiment of an aggregated trading system that includes interfacing client devices through a switch directly to matching engines and their tradeable objects. Generally speaking, the alternative embodiment indicated as 600 in FIG. 6 is a schematic representation that includes some of the software components described with respect to the aggregate trading system 100 shown in FIG. 2. Bids and offers are received from client devices 108 at the exchange interface 602. Similarly to what was described above with respect to FIG. 2, the exchange interface 602 is the point at which a connection is preferably made between the client devices 108 and system 600 so that they can work with each other and exchange information. Information that might be exchanged between each other includes bids and offers and order book information. Of course, other types of information know to those of ordinary skill in the art may also be provided in the data streams.

The aggregate trading system 600 further includes an exchange switch 604 that automatically directs the bids and offers to the appropriate matching engines generally indicated as 606. Exchange switch 604 may be electronically coupled (via software calls or a data bus, for instance) to exchange interface 602. Then, upon receiving a bid message or an offer message, in one instance, the exchange switch 604 may parse the message to determine which matching engine 606 to route the bid or offer message. An entity may own one or more of the matching engines 606.

Figure 7:
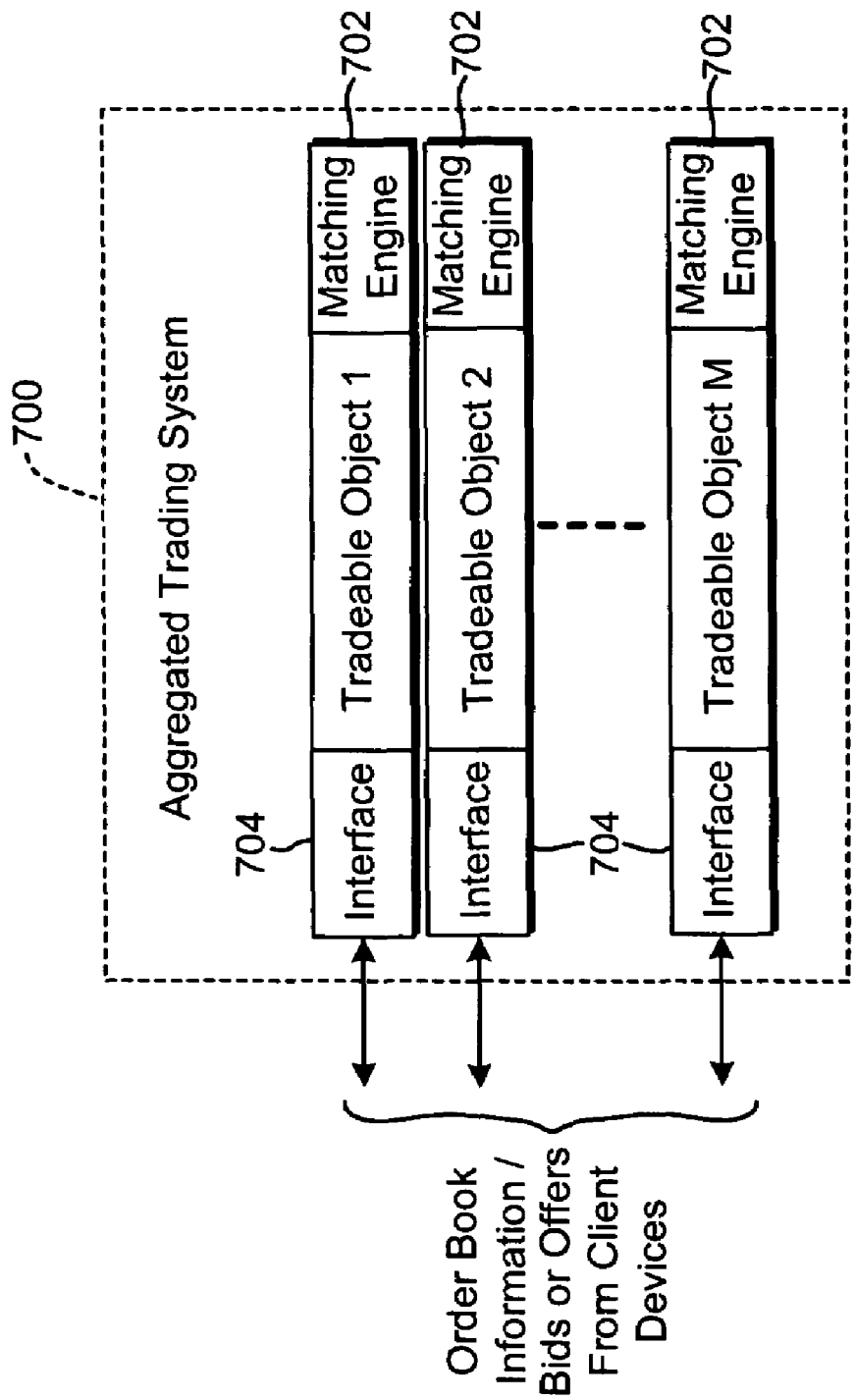
FIG. 7 is a schematic of an alternative embodiment of an aggregated trading system that includes interfacing client devices directly with matching engines and their tradeable objects.

FIG. 7 is a schematic of an alternative embodiment of an aggregated trading system that includes interfacing client devices directly with matching engines and their tradeable objects. This alternative embodiment is indicated as 700. In this embodiment, traders can directly interface with the matching engines generally indicated as 702 without going through one or more switches. In particular, traders can connect to one or more interfaces generally indicated as 704 to access matching engines 702. Any kind of communication link (such as those described above) may be used to connect client devices to the interfaces 704 of system 700.

VIII. CONCLUSION

An electronic trading system is described herein for hosting a collection of one or more electronic exchanges, in which, an entity may lease or purchase, for example, virtual space in the aggregated trading system. So, for example, if an entity has a registered tradeable object, then using the preferred system, he or she may list the object to trade at the aggregated trading system. As a result, traders who are already connected to the aggregated trading system, may also trade this entity's tradeable object.

Of course, there are many advantages and features of the aggregate trading system. Some example advantages and features are described herein, and other advantages of the system will become apparent to those of ordinary skill in the art upon examination of the drawings and description contained herein. It is intended that all such additional systems, methods, features, and advantages be included within the description.

One advantage is that an entity with registered tradeable objects can host one or more markets on a trading system that generally has a larger trader draw than if the individual attempted to become a stand-alone exchange. For instance, the aggregated trading system may have a large number of traders already connected through a sophisticated structure of networks. Through these networks, traders may have access to all of the various exchanges that are hosted by the present system including small exchanges.

Another advantage is that because an existing structure is in place, extra expense normally associated with setting up and implementing an exchange to attract the necessary volume may already be set in place by the aggregated trading system. With that said, software and/or hardware used to run the matching engine for the newly registered tradeable object may be simply installed at the aggregated trading system.

That way, for example, a newly registered tradeable object may be put into the market faster using the present system than by starting a new exchange or building upon an old exchange.

Yet, another advantage is that because a collection of markets is assembled together, the trader has a choice among a variety of tradeable objects to trade. Preferably, without unnecessary complications, a trader may quickly trade one, some, or all of the tradeable objects listed at the aggregated trading system.

Preferred embodiments of the present invention have been described herein. It is to be understood, of course, that changes and modifications may be made in the embodiments without departing from the true scope of the present invention, as defined by the appended claims. The present embodiment preferably includes logic to implement the described methods in software modules as a set of computer executable software instructions. A processor may execute the software modules and may be programmed by those of skill in the art to provide the described functionality.

The software may be represented as a sequence of binary bits maintained on a computer readable medium. The computer readable medium may include magnetic disks, optical disks, and any other volatile or (e.g., Random Access memory ("RAM")) non-volatile firmware (e.g., Read Only Memory ("ROM")) storage system readable by the processor. The memory locations where data bits are maintained also include physical locations that have particular electrical, magnetic, optical, or organic properties corresponding to the stored data bits. The software instructions may be executed as data bits by the processor with a memory system causing a transformation of the electrical signal representation, and the maintenance of data bits at memory locations in the memory system to thereby reconfigure or otherwise alter the unit's operation. The executable software code may implement, for example, the methods as described above.

It should be understood that the programs, processes, methods and apparatus described herein are not related or limited to any particular type of computer or network apparatus (hardware or software), unless indicated otherwise. Various types of general purpose or specialized computer apparatus or computing device may be used with or perform operations in accordance with the teachings described herein.

It should further be understood that a hardware embodiment might take a variety of different forms. The hardware may be implemented as an integrated circuit with custom gate arrays or an application specific integrated circuit ("ASIC"). The embodiment may also be implemented with discrete hardware components and circuitry. In particular, it is understood that the logic structures and method steps may be implemented in dedicated hardware such as an ASIC, or as program instructions carried out by a microprocessor or other computing device. It should also be understood that each electronic exchange or matching engine may be implemented in hardware and may be rack-mounted, so that adding/removing a matching engine can be simply accomplished by sliding a component into or out of the rack, for example.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A computer-based system for hosting a collection of independent electronic exchanges for use in electronic trading from remote client devices, the system comprising:

means for hosting the collection of independent electronic exchanges, wherein each independent electronic exchange lists at least one tradeable object for trading among buyers and sellers;

means for receiving bids to purchase or offers to sell a tradeable object listed at a particular independent electronic exchange in the collection of independent electronic exchanges from a plurality of remote client devices in communication with the means for hosting; and means for directing the bids and offers to the particular independent electronic exchange, wherein a matching engine for the particular independent electronic exchange receives the bids and offers and automatically matches the bids and offers.

2. The computer-based system of claim 1 wherein the collection of independent electronic exchanges is made up of separately designated contract markets under a regulating body.

3. The computer-based system of claim 2 wherein the contract markets are designated by the regulating body known as the Commodity Futures Trading Commission (CFTC).

4. The computer-based system of claim 1 wherein each independent electronic exchange operates as a self-contained functional trading system from any other independent electronic exchanges hosted by the hosting means.

5. The computer-based system of claim 1 wherein the means for hosting comprises a computer that provides the hardware and software needed to run the electronic exchange.

6. The computer-based system of claim 1 wherein the means for receiving bids to purchase or offers to sell a tradeable object comprises a computer gateway that is electronically coupled to the means for hosting.

7. The computer-based system of claim 1 wherein the means for directing the bids and offers to the particular independent electronic exchange comprises the hardware and software needed to read the incoming bids and offers and then forwards the bids and offers to the appropriate electronic exchange.

8. The computer-based system of claim 1 wherein electronic exchanges can be added to or removed from the collection of independent electronic exchanges.

9. The computer-based system of claim 1 further comprising:
   a means for storing software that performs trading tasks on behalf of the buyer or the seller, wherein the means for storing software is electronically coupled to the means for hosting.

10. The computer-based system of claim 1 further comprising:
    a means for forwarding bids and offers on behalf of a buyer or seller to electronic exchanges that are in the collection of independent electronic exchanges.

11. The computer-based system of claim 1 further comprising:
    a means for forwarding bids or offers on behalf of a buyer or seller to electronic exchanges that are remote from the collection of independent electronic exchanges.

12. A computer-based method for hosting a collection of independent electronic exchanges for use in electronic trading from remote client devices, the method comprising:
    hosting the collection of independent electronic exchanges, wherein each independent electronic exchange lists at least one tradeable object for trading among buyers and sellers;
    receiving bids to purchase or offers to sell a tradeable object listed at a particular independent electronic exchange in the collection of independent electronic exchanges from a plurality of remote client devices in communication with the means for hosting; and
    directing the bids and offers to the particular independent electronic exchange, wherein a matching engine for the particular independent electronic exchange receives the bids and offers and automatically matches the bids and offers.

* * * * *